US011125556B2

(12) United States Patent
Lam et al.

(10) Patent No.: US 11,125,556 B2
(45) Date of Patent: Sep. 21, 2021

(54) METHOD AND SYSTEM FOR MONITORING AND ASSESSING ROAD CONDITIONS

(71) Applicant: BCE INC., Verdun (CA)

(72) Inventors: Ken Lam, Verdun (CA); Etienne Coronado, Verdun (CA)

(73) Assignee: BCE INC., Verdun (CA)

( * ) Notice: Subject to any disclaimer, the term of this patent is extended or adjusted under 35 U.S.C. 154(b) by 358 days.

(21) Appl. No.: 16/228,606

(22) Filed: Dec. 20, 2018

(65) Prior Publication Data
US 2019/0195628 A1 Jun. 27, 2019

Related U.S. Application Data

(60) Provisional application No. 62/609,154, filed on Dec. 21, 2017.

(51) Int. Cl.
| | |
|---|---|
| *G01B 21/30* | (2006.01) |
| *G08G 1/01* | (2006.01) |
| *G08G 1/052* | (2006.01) |
| *H04L 29/08* | (2006.01) |

(52) U.S. Cl.
CPC .......... *G01B 21/30* (2013.01); *G08G 1/0112* (2013.01); *G08G 1/0129* (2013.01); *G08G 1/0133* (2013.01); *G08G 1/0141* (2013.01); *G08G 1/052* (2013.01); *H04L 67/12* (2013.01)

(58) Field of Classification Search
CPC .... G01B 21/30; G08G 1/0129; G08G 1/0112; G08G 1/0141; G08G 1/0133; G08G 1/052; H04L 67/12
See application file for complete search history.

(56) References Cited

U.S. PATENT DOCUMENTS

| | | | | |
|---|---|---|---|---|
| 8,566,010 B2 * | 10/2013 | Sarma | .................. | G08G 1/0112 |
| | | | | 701/118 |
| 2018/0012490 A1 * | 1/2018 | Jodorkovsky | .... | G08G 1/096775 |

FOREIGN PATENT DOCUMENTS

| | | | | | |
|---|---|---|---|---|---|
| CN | 103262136 | * | 8/2013 | ......... | G01C 21/3492 |
| CN | 104484911 A | * | 4/2015 | ............... | G07C 5/08 |
| CN | 105716620 | * | 6/2016 | ......... | G01C 21/3492 |
| CN | 105716620 B | * | 3/2018 | ......... | G01C 21/3446 |
| CN | 108737492 A | * | 11/2018 | ............. | H04L 67/18 |
| CN | 112765257 A | * | 5/2021 | ............. | G06F 16/26 |
| FR | 3015036 A1 | * | 6/2015 | ............. | G01N 29/14 |

* cited by examiner

*Primary Examiner* — Tung S Lau

(57) ABSTRACT

Systems and methods for monitoring and assessing road conditions are disclosed herein that receive raw data comprising information indicative of road conditions from various types of remote devices. The road condition data may be normalized based on the type of the remote device and the normalized road condition data may be stored. A road condition model may be generated based on the normalized road condition data and using the device location. The road condition model may be used to identify pothole locations, rate road segments, etc. The road condition model may apply various data set weightings and learning algorithms to present an accurate result. The road condition model may be optimized based on feedback from city personnel and other sources of information to determine the accuracy of the model outputs. The road condition model may also be trained to ensure accuracy.

18 Claims, 11 Drawing Sheets

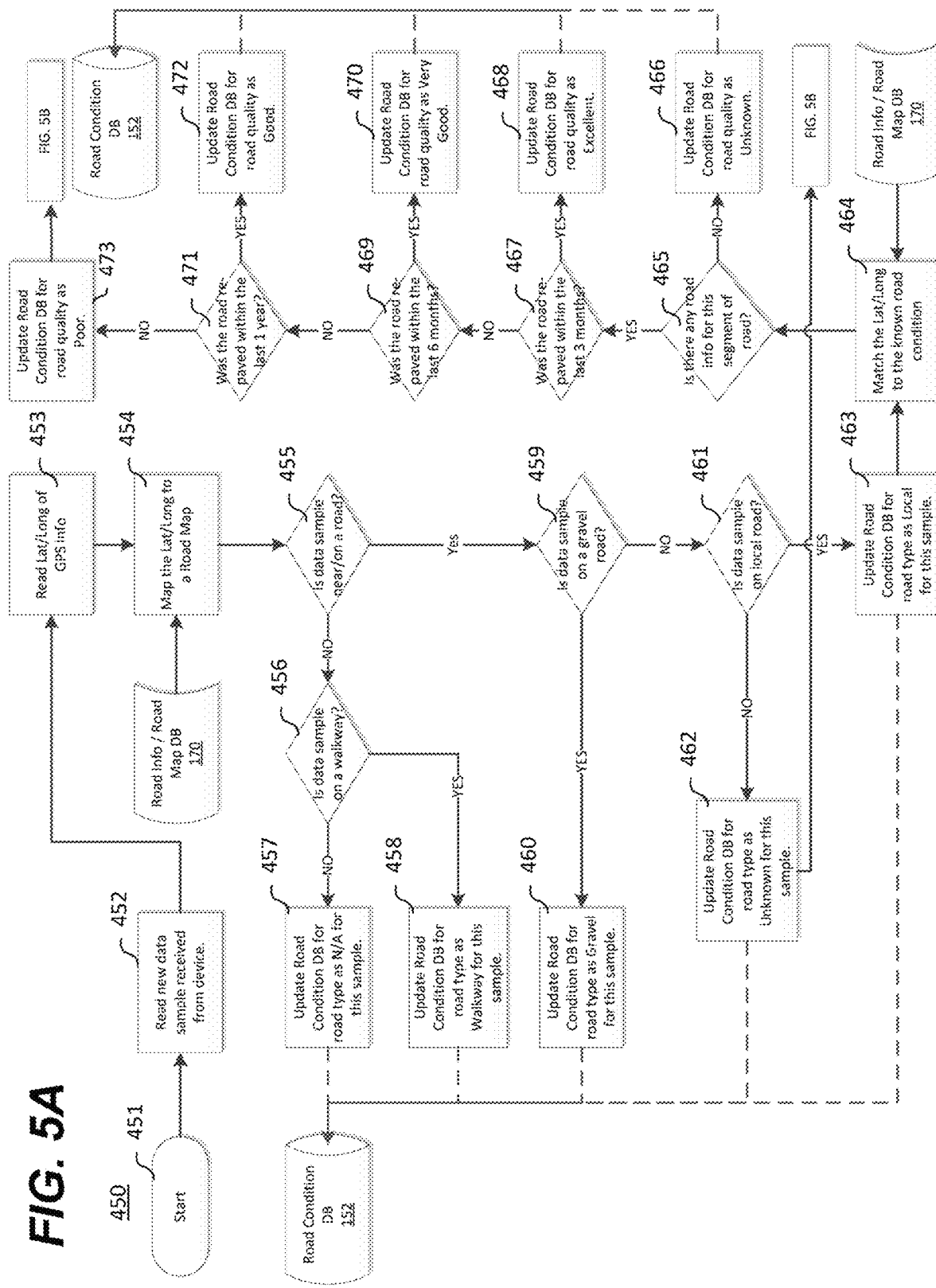

METHOD AND SYSTEM FOR MONITORING AND ASSESSING ROAD CONDITIONS

TECHNICAL FIELD

The present disclosure relates to monitoring and assessing road conditions, and in particular to the use of mobile devices of individuals for the monitoring and assessing road conditions.

BACKGROUND

Information pertaining to road conditions is invaluable. The identification of road issues such as potholes, cracking, bumps, etc., is required for city officials to dispatch engineering teams and maintenance workers to repair the road(s) and ensure the safety of drivers. Insurance companies may also be interested in using road condition information to adjust insurance rates. For example, a driver that consistently drives on a road that has numerous potholes may be more at risk of sustaining damage to their vehicle than a driver who drives on a road without potholes.

Road condition information is typically gathered by city workers as they drive city streets. City inhabitants may also call the city to inform of deteriorating road conditions. Accordingly, the road condition information is rather limited and requires a human to visually examine the road and identify the condition and any issues thereof. The city may not be aware of a road issue until long after the issue has started, leading to inefficiencies in repairing roads. A driver and/or their vehicle may be seriously injured/damaged due to the road issue, which could have been prevented had the city been made aware of this issue earlier. This can also lead to claims being filed against the city.

Accordingly, systems and methods that enable additional, alternative, and/or improved monitoring and assessing of road conditions are desirable.

SUMMARY

In accordance with the current disclosure there is provided a method comprising: receiving at a server raw road condition data and associated location information from a remote device indicative of a road condition; normalizing at the server the raw road condition data based on a type of the remote device; applying at the server the normalized road condition data to a road condition model generated from previously received road condition data for use in predicting road conditions; and identifying at the server from the road condition model whether there is a road issue for a road segment associated with the location information.

In a further embodiment of the method, the raw road condition data is any one or more of: vibration data, speed data, device status, location data, and weather data.

In a further embodiment of the method, the remote device is any one of: a mobile device of a user in a vehicle, and a telematics device of the vehicle.

In a further embodiment, the method further comprises determining if the vehicle is traveling on the road segment, wherein the road condition model for the road segment is generated at least in part from the normalized data when it is determined that the vehicle is traveling on the road segment.

In a further embodiment, the method further comprises storing the normalized data as a baseline for the type of the remote device when it is determined that the vehicle is not traveling on the road segment.

In a further embodiment of the method, the raw road condition data is normalized by applying normalization rules derived from one or both of the received raw road condition data and previously received raw road condition data for the type of the remote device.

In a further embodiment of the method, the road condition model is generated further based on external data received from a third party.

In a further embodiment of the method, the road condition model is generated further based on data received from internal sources.

In a further embodiment of the method, the raw road condition data comprises the device status, and wherein normalized road condition data indicating that the remote device is being held by a user is excluded when generating the road condition model.

In a further embodiment of the method, the raw road condition data comprises vibration data, and wherein the road issue is determined if vibration data exceeds a vibration threshold value.

In a further embodiment of the method, the road issue is determined further based on a duration of the vibration data.

In a further embodiment of the method, the road issue is a pothole.

In a further embodiment of the method, the road condition model is trained by determining weights to be applied to the normalized road condition data.

In a further embodiment, the method further comprises applying the weights to the normalized road condition data; and comparing an output to observed feedback information; and adjusting the weights if the output does not match to the feedback information within a threshold amount.

In a further embodiment, the method further comprises rating the road segment based on the road condition model.

In accordance with the present disclosure there is provided a system comprising: a processor; and a memory operably coupled with the processor, the memory comprising computer-readable instructions stored thereon which, when executed by the processor, configure the processor to: receive raw road condition data and associated location information from a remote device indicative of a road condition; normalize the raw road condition data based on a type of the remote device; apply the normalized road condition data to a road condition model generated from previously received road condition data for use in predicting road conditions; and identify from the road condition model whether there is a road issue for a road segment associated with the location information.

In a further embodiment of the system, the remote device is any one of: a mobile device of a user in a vehicle, and a telematics device of the vehicle.

In a further embodiment of the system, the instructions when executed by the processor further configure the system to: determine if the vehicle is traveling on the road segment, wherein the road condition model for the road segment is generated at least in part from the normalized data when it is determined that the vehicle is traveling on the road segment.

In a further embodiment of the system, the instructions when executed by the processor further configure the system to: store the normalized data as a baseline for the type of the remote device when it is determined that the vehicle is not traveling on the road segment.

In a further embodiment of the system, the raw road condition data is normalized by applying normalization rules derived from one or both of the received raw road condition data and previously received raw road condition data for the type of the remote device.

In a further embodiment of the system, the road condition model is generated further based on external data received from a third party.

In a further embodiment of the system, the road condition model is generated further based on data received from internal sources.

In a further embodiment of the system, the raw road condition data is any one or more of: vibration data, speed data, device status, location data, and weather data.

In a further embodiment of the system, the raw road condition data comprises the device status, and wherein normalized road condition data indicating that the remote device is being held by a user is excluded when generating the road condition model.

In a further embodiment of the system, the raw road condition data comprises vibration data, and wherein the road issue is determined if vibration data exceeds a vibration threshold value.

In a further embodiment of the system, the road issue is determined further based on a duration of the vibration data.

In a further embodiment of the system, the road issue is a pothole.

In a further embodiment of the system, the road condition model is trained by determining weights to be applied to the normalized road condition data.

In a further embodiment of the system, the instructions when executed by the processor further configure the system to: apply the weights to the normalized road condition data; and compare an output to observed feedback information; and adjust the weights if the output does not match to the feedback information within a threshold amount.

In a further embodiment of the system, the instructions when executed by the processor further configure the system to: rate the road segment based on the road condition model.

In accordance with a further embodiment of the present disclosure there is provided a non-transitory computer-readable medium having computer-executable instructions stored thereon, which when executed by a computer, configure the computer to perform a method comprising: receive raw road condition data and associated location information from a remote device indicative of a road condition; normalize the raw road condition data based on a type of the remote device; apply the normalized road condition data to a road condition model generated from previously received road condition data for use in predicting road conditions; and identify from the road condition model whether there is a road issue for a road segment associated with the location information.

In a further embodiment of the non-transitory computer-readable medium, the remote device is any one of: a mobile device of a user in a vehicle, and a telematics device of the vehicle.

In a further embodiment of the non-transitory computer-readable medium, the instructions when executed by the processor further configure the system to: determine if the vehicle is traveling on the road segment, wherein the road condition model for the road segment is generated at least in part from the normalized data when it is determined that the vehicle is traveling on the road segment.

In a further embodiment of the non-transitory computer-readable medium, the instructions when executed by the processor further configure the system to: store the normalized data as a baseline for the type of the remote device when it is determined that the vehicle is not traveling on the road segment.

In a further embodiment of the non-transitory computer-readable medium, the raw road condition data is normalized by applying normalization rules derived from one or both of the received raw road condition data and previously received raw road condition data for the type of the remote device.

In a further embodiment of the non-transitory computer-readable medium, the road condition model is generated further based on external data received from a third party.

In a further embodiment of the non-transitory computer-readable medium, herein the road condition model is generated further based on data received from internal sources.

In a further embodiment of the non-transitory computer-readable medium, the raw road condition data is any one or more of: vibration data, speed data, device status, location data, and weather data.

In a further embodiment of the non-transitory computer-readable medium, the raw road condition data comprises the device status, and wherein normalized road condition data indicating that the remote device is being held by a user is excluded when generating the road condition model.

In a further embodiment of the non-transitory computer-readable medium, the raw road condition data comprises vibration data, and wherein the road issue is determined if vibration data exceeds a vibration threshold value.

In a further embodiment of the non-transitory computer-readable medium, the road issue is determined further based on a duration of the vibration data.

In a further embodiment of the non-transitory computer-readable medium, the road issue is a pothole.

In a further embodiment of the non-transitory computer-readable medium, the road condition model is trained by determining weights to be applied to the normalized road condition data.

In a further embodiment of the non-transitory computer-readable medium, the instructions when executed by the processor further configure the system to: apply the weights to the normalized road condition data; and compare an output to observed feedback information; and adjust the weights if the output does not match to the feedback information within a threshold amount.

In a further embodiment of the non-transitory computer-readable medium, the instructions when executed by the processor further configure the system to: rate the road segment based on the road condition model.

BRIEF DESCRIPTION OF THE DRAWINGS

Further features and advantages of the present disclosure will become apparent from the following detailed description, taken in combination with the appended drawings, in which:

FIGS. 5A and 5B depict a method for combining raw data from a remote device with other data sources;

It will be noted that throughout the appended drawings, like features are identified by like reference numerals.

DETAILED DESCRIPTION

Methods and systems for monitoring and assessing road conditions are disclosed herein. The road conditions may be monitored through data collected from mobile devices of users travelling on the road. Raw data collected from the plurality of user devices comprising information indicative of road conditions, as well as a location, may be received at a road condition server over a wireless telecommunications network. The information indicative of the road conditions may be collected from one or more sensor of the mobile device. Although referred to as being collected by a user's mobile device, the road condition data may be received from any remote device travelling on the road, including for example the user's mobile device, as well as car telematics sensors/systems, etc. The road condition data received at the server may be provided by a wide range of different devices, each of which may measure data differently. The received data may be normalized based on the type of the remote device so that raw data from different devices can be meaningfully compared and/or combined together. The road data may also be combined with other types of data, such as weather data, external sources of road information, etc.

The normalized road condition data may be stored in a road condition database and a road condition model can be generated based on the normalized road condition data and associated locations. The road condition model may be used to identify pothole locations, rate road segments, etc. The road condition model may apply various data set weightings and learning algorithms to provide a prediction of road conditions at particular locations. The road condition model may be trained based on feedback from, for example, city personnel and other sources of information providing an indication of observed road conditions, which allows for the weightings and learning algorithms to be updated as needed. The road condition model may be initially trained using supervised or unsupervised learning techniques and then further trained or refined using feedback information.

The methods and systems for monitoring and assessing road conditions as described herein may help to allow city personnel to identify and repair any road issues, without requiring a human to first visually observe and report the road issue in order for the issue to be identified. In addition to potentially providing information on potholes, the road monitoring may provide other information on the condition of roads that may be useful to various parties, including cities, residents, businesses, etc.

Embodiments are described below, by way of example only, with reference to FIGS. 1-10.

Figure 1:
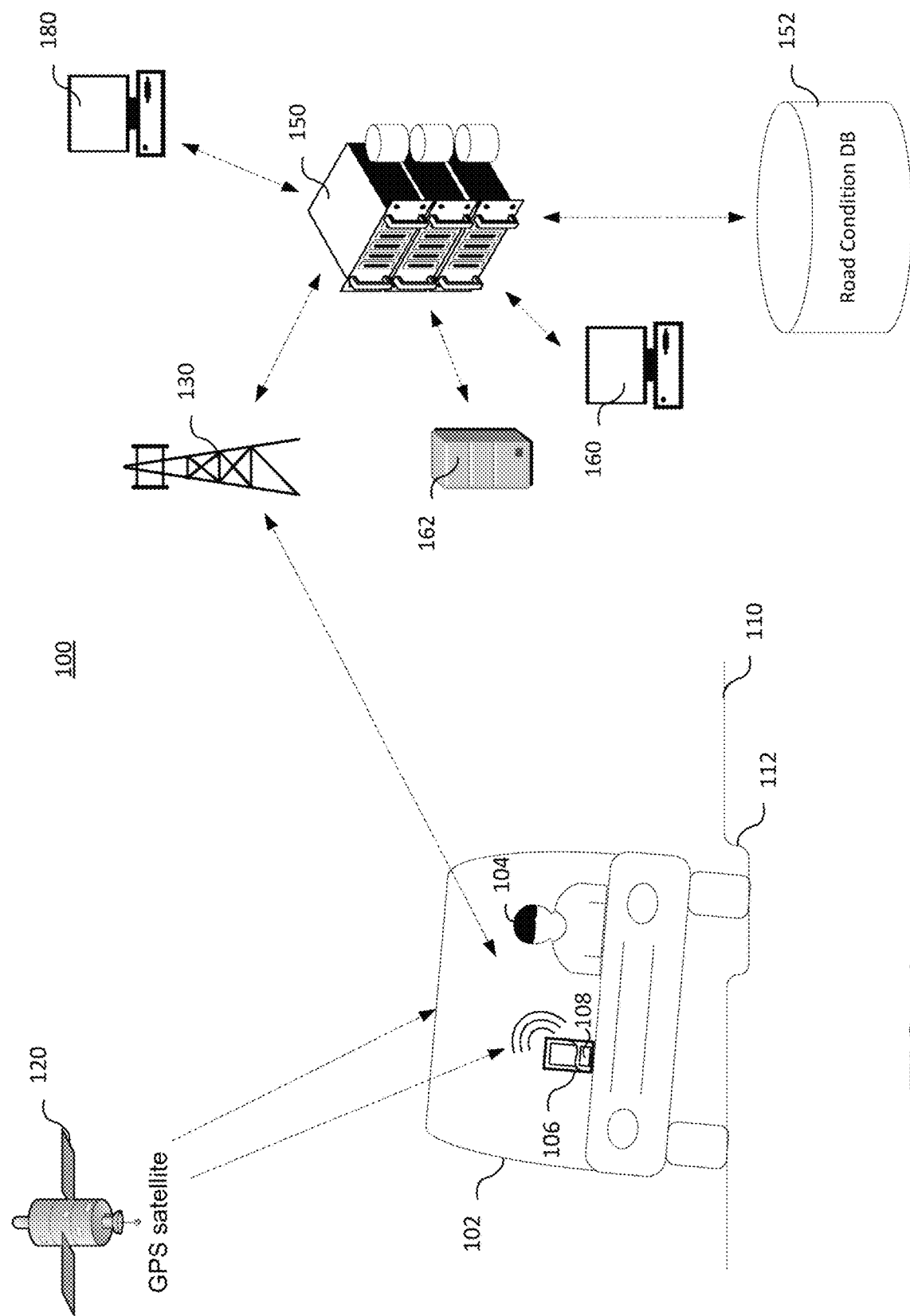
FIG. 1 depicts a representation of a system for monitoring and assessing road conditions.

FIG. 1 depicts a representation of a system 100 for monitoring and assessing road conditions. Car 102 may be driven along road 110 by a user 104 of a mobile device 106, or the user 104 of mobile device 106 may be a passenger in the car 102. The mobile device 106 may comprise one or more internal sensors 108, such as accelerometers, gyroscopes, GPS receivers etc. Additionally or alternatively, the one or more sensors for collecting road condition information may be separate from the mobile device 106 and paired to the mobile device. Additionally or alternatively, the car 102 may further be equipped with one or more telematics devices, which may include for example accelerometers, gyroscopes, GPS receivers etc. As the car 102 travels along road 110, the mobile device 106 and sensor 108 may be collecting and recording various data pertaining to the road condition. For example, the mobile device may collect data from the tilt of the automobile, or the mobile device within the automobile, as well as vibrations or other accelerations of the mobile device as well as location information when the data weas collected. The mobile device 106 and sensor 108 may be connected to a wireless communication network, and the data collected and recorded by the mobile device 106 and sensor 108 may be sent over the wireless communication network via cell tower 130 to a road condition server 150. The mobile device 106 and sensor 108 may also be referred to herein more generally as 'a remote device'. Although a car is depicted in FIG. 1, it would be readily appreciated that the scope of this disclosure is not limited to such and may apply to any type of vehicle travelling over the road.

The data collected and recorded by the mobile device 106 and sensor 108 may comprise vibration data, speed data, device status, location data, weather data, etc., which may be indicative of a condition of the road 110 that the car 102 is travelling along. Such data may be referred to herein more generally as 'road condition data'. For example, the car 102 may travel over a pothole 112 in the road 110, which may be reflected in the vibration data of the remote devices. The mobile device 106 and car 102 and/or sensor 108 may also comprise a GPS receiver, which may be used for determining the location of the mobile device 106 and car 102 and/or sensor 108 by using GPS signals received from GPS satellite 120. This location data (GPS data) may be useful in determining the location of the pothole 112, or other road conditions, and identifying a road segment that the car is travelling along. The location data may also be useful in determining the speed of the car 102, which may be useful in determining road conditions. The road condition data may be transmitted to the road condition server 150.

The road condition data received at the road condition server 150 may store the received data in a road condition database 152 or other similar structure. The road condition server 150 may perform various actions on the received data, such as normalizing road condition data, generating a road condition model, identifying issues associated with road segments, etc., as will be further described herein. The road condition server 150 may comprise a processor and a memory that stores computer-executable instructions. When the computer-executable instructions are executed by the processor, the executed instructions configured the server 150 to perform various functionality pertaining to the monitoring and assessing of road conditions, as further described herein.

The results/outputs of the methods performed by the road condition server 150 may be stored in the road condition database 152. The stored results may then be accessed by a user of the road condition server 150, such as through a computer 180. The user of the road condition server 150 may be an individual, a city worker, insurance agent/underwriter, etc. If the monitoring and assessing of road conditions as performed by the road condition server 150 identifies a road issue, for example a pothole above a certain threshold size, a notification may be generated and sent to the appropriate stakeholder, such as the user of computer 180.

The road condition server 150 may receive additional road condition data from various other data sources to assist with and improve the prediction of road conditions. As will be further described herein, the data sources may provide road condition data collected from various individuals, such as city personnel, maintenance workers, engineers, and city drivers. Individuals may be able to input the additional road condition data to the road condition server 150, for example, through a web portal accessed by computer 160 or mobile device. The road condition server 150 may also receive additional road condition data from other servers/platforms, such as server 162, which may or may not be provided by a third party. For example, the server 162 may be a weather service that provides weather information to the road condition server 150. The weather information may be useful in gleaning insights from the road condition data received at the road condition server 150. For example, the road condition server 150 may receive vibration data and location data from mobile device 106. The vibration data may suggest that the drive along the road 110 is very bumpy, which may be indicative of a deteriorating road conditions. However, weather data at the location of the mobile device 106 where the road appeared to be bumpy be indicate that significant snow has fallen which may be the cause for the apparent deteriorating road conditions. Reference to the server 162 as a weather service is exemplary only and, as will become more apparent below, the road condition server 150 may connect to several different other servers/platforms, such as for obtaining road maps, location of current road works projects, other sources of road condition information, device normalization data, car data, etc.

Figure 2:
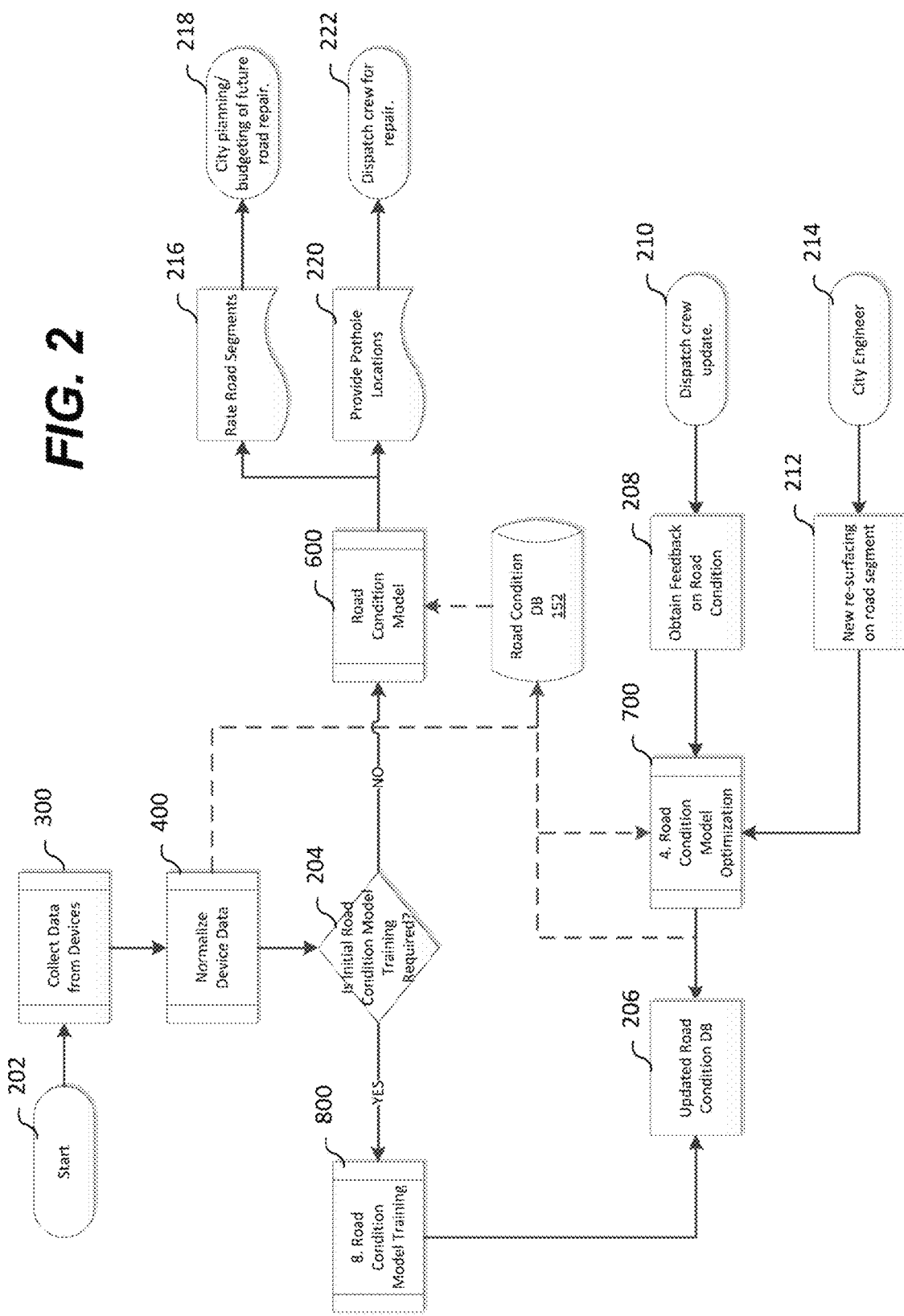
FIG. 2 depicts an overview of a method for monitoring and assessing road conditions.

FIG. 2 depicts an overview of a method 200 for monitoring and assessing road conditions. The method 200 for monitoring and assessing road conditions may be stored as computer-executable instructions on a memory of the road condition server 150, and the processor of the road condition server 150 may execute the computer-executable instructions to configure the road condition server to perform the method 200.

Figure 3:
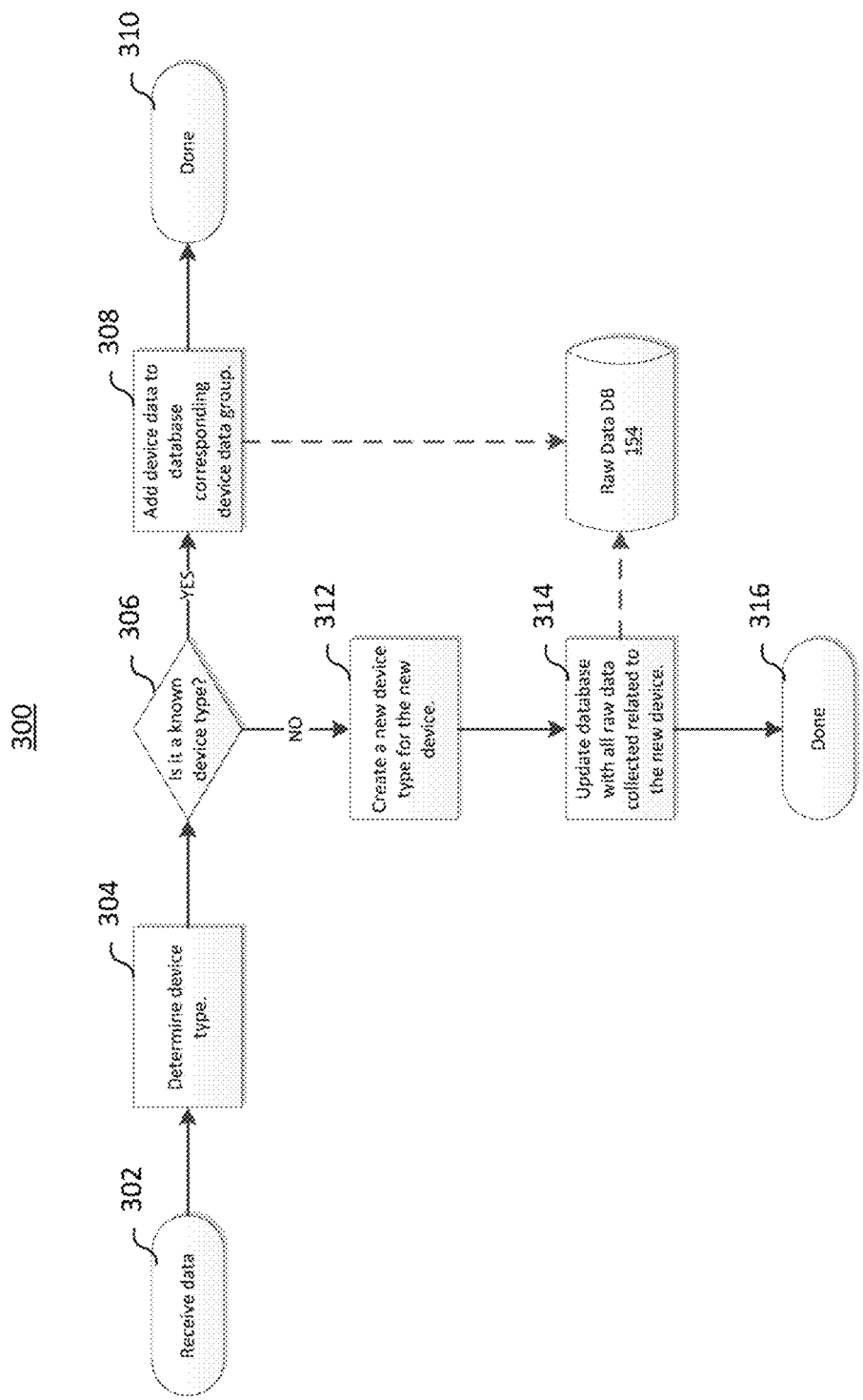
FIG. 3 depicts a method for collecting data from a remote device.

The method 200 commences (202) by collecting road condition data from the remote devices (300) as depicted further in the FIG. 3. The road condition data received from the remote devices is normalized (400) as depicted further in FIG. 4. The device data may be normalized based on the type of device that collected the data. For example, a first device type may register vibration information on a scale of 1 to 100, while a second device type may register vibration information on a scale of 1 to 50. Normalizing data from different devices allows the collected data to be combined together, without skewing the data. The normalized device data may be stored in a road condition database 152.

The method 200 may further comprise determining if initial model training of a road condition model is required (204). If the collected road condition data requires model training (Yes at 204), the road condition model is subject to road condition model training (800) as further depicted in FIG. 8. The trained road condition model and/or the training parameters used may be inputted into the road condition database 152 (206). The road condition model may be optimized (700) as further depicted in FIG. 7. The road condition model optimization may be based on road condition feedback (208) received from dispatched crews (210), from reporting applications for individuals, and/or the optimization may be based on surface changes to a road segment (212) received from a city engineer (214), for example.

Figure 6:
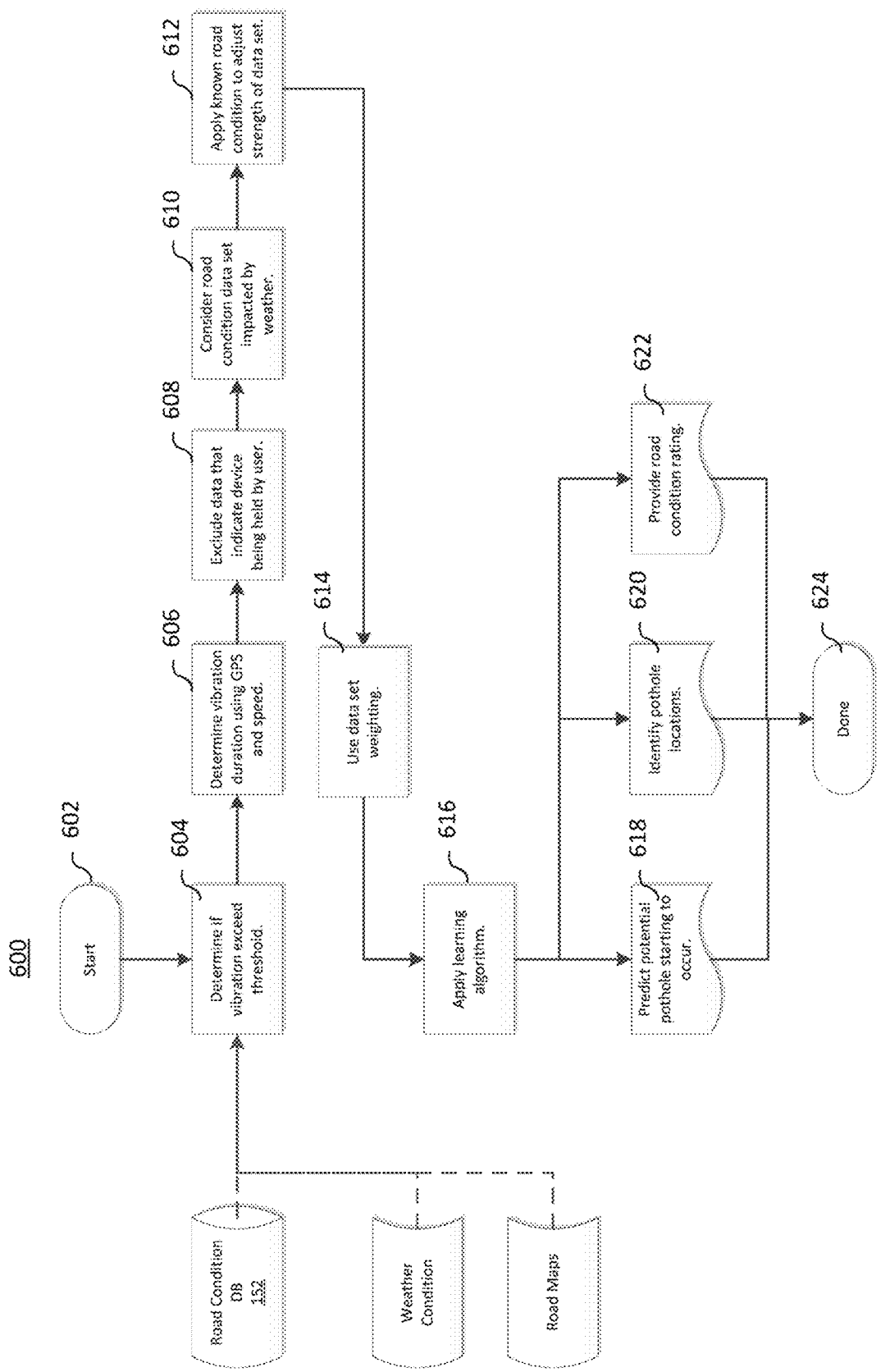
FIG. 6 depicts a method of generating a road condition model.

If the collected road condition data does not require model training (No at 202), a road condition model is executed (600) as further depicted in FIG. 6. The road condition database 152 may provide data to the road condition model for analysis and generation/updating of the model. The road condition model may be generated to perform monitoring and assessment of road condition segments based on both new and historical road condition and other data. The road condition model may rate road segments (216), which may promote future road repair depending on the city planning or budgeting (218). The road condition model may additionally and/or alternatively identify pothole locations (220), which may provide an indication for the city crew to be dispatched for pothole repair (222).

As depicted in FIG. 2, the road condition database 152 may be responsible for providing inputs into the road condition model. The road condition database 152 may comprise data such as GPS information, speed data, vibration data, road segment ratings, weather data, sound data, device type data, known road conditions, weighting rules, etc. The foregoing list of information stored in the road condition database 152 is non-exhaustive and a person skilled in the art will readily appreciate different types of information that may be stored in the road condition database 152 and how the information could be used in the road condition model without departing from the scope of the present disclosure.

FIG. 3 depicts a method 300 for collecting data from a remote device. Road condition data is received (302) from one or more remote devices at the road condition server 150. For example, the received road condition data may comprise vibration data, speed data, device status, location data, weather data, etc. The method 300 further comprises determining the type of remote device being used to collect data (304). For example, the determination may be whether the device is a mobile device or a car telematics sensor. The determination may further involve determining the make/model of the remote device as well as possibly additional information such as software versions running on the device. For example, if the remote device is a mobile device, the device type may be determined to be an Apple iPhone.

A determination is made if the device type is known (306). If the type of remote device is known (Yes at 306), the remote device data is added to a raw data database 154 corresponding to the remote device's data group (308) and the method 300 ends (310). If the type of remote device is unknown (No at 306), a new remote device type is created (312). The raw data database 154 may be updated with all of the raw data collected from remote devices related to the new remote device type (314) and the method ends (316).

The raw data database 154 depicted in FIG. 3 may be separate from or a part of the road condition database 152. The raw data database 154 may represent an intermediary storage of data that has been collected prior to normalizing the data. By identifying whether the device type is a known device type, and by updating the raw data database 154 in a data group corresponding to the device type, may help to facilitate the normalization of device data, as will be described with reference to FIG. 4. As previously described, the methods and systems for monitoring and assessing road conditions as disclosed herein are configured to collect data from any type of device and combine the data from different devices.

Figure 4:
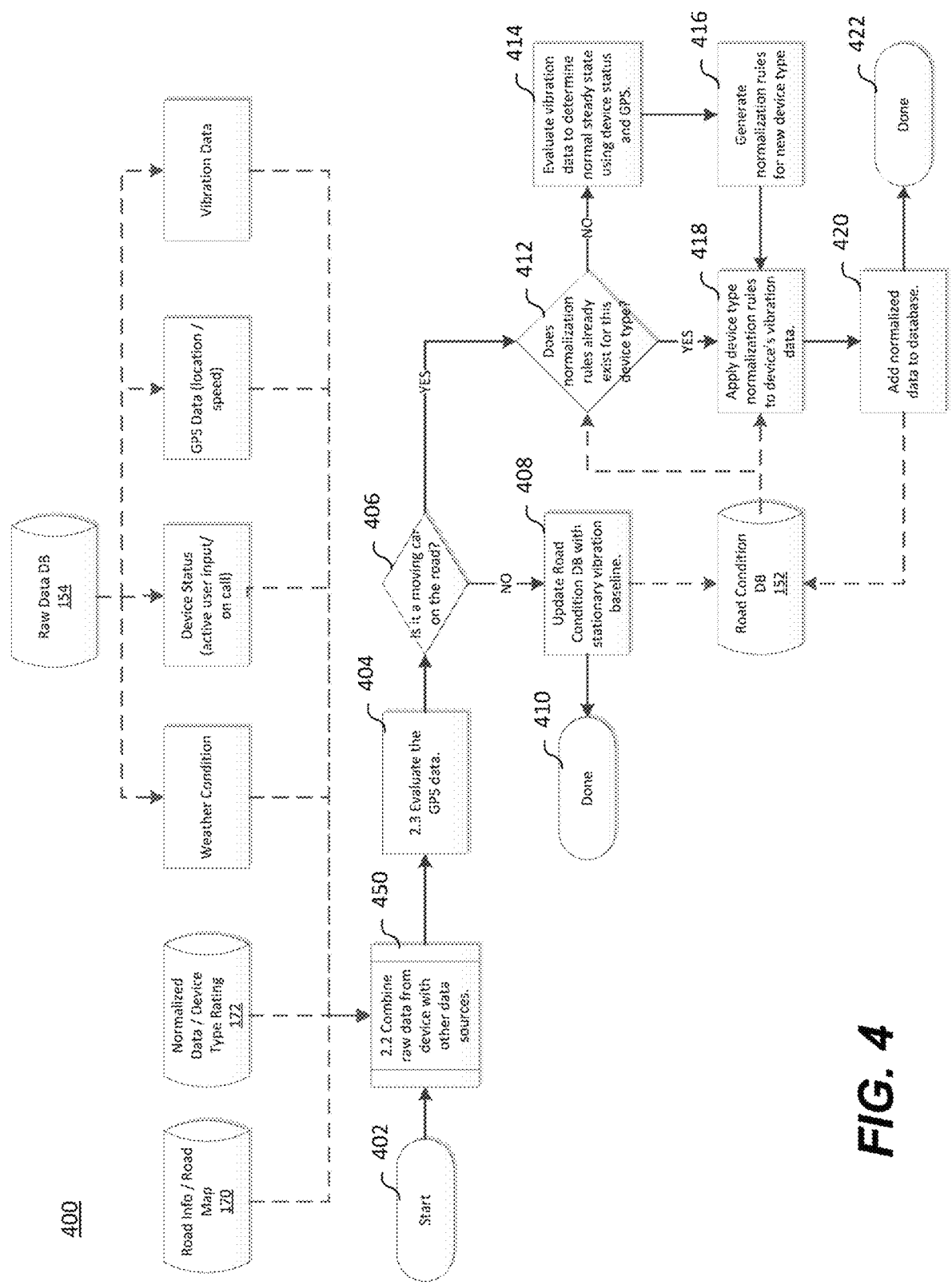
FIG. 4 depicts a method for normalizing device data.

FIG. 4 depicts a method 400 for normalizing remote device data. The remote device data may be collected by different remote device types, as previously described. To better perform the analysis of the received road condition data, the collected data is normalized.

The method 400 commences (402) by combining all of the data from the remote device raw data and other data sources that was collected (450) as depicted further in FIGS.

5A and 5B. The raw data that was received from a remote device and was stored in the raw data database 154, as described with reference to FIG. 3, is combined with other data sources. The raw data may comprise weather condition data (for example, a car sensor may sense weather-related information such as temperature, wind, rain, etc.), device status (for example, if the device is a mobile phone, the device status may indicate if the user is on a call or actively inputting to the phone, the orientation of the phone), GPS data (which may indicate the location/speed of the car), vibration data, etc. The data received from the remote device and which is retrieved from the raw data database 154 may herein be referred to as 'raw road condition data'. As depicted in FIG. 4, the raw road condition data may be combined with external data, which may be received/retrieved from a road information/road maps database 170 and a normalized data/device type rating database 172. These external data sources may be provided, for example, from servers/platforms, such as server 162 depicted in FIG. 1. The normalized data/device type rating database may provide device-specific information that is used to normalize/calibrate the raw road condition data received from the respective device.

The GPS data from the combined data is evaluated (404). A determination is made if the car is moving along a road (406). If the data is not from a moving car on the road (No at 406), the road condition database 152 is updated with a stationary vibration baseline (408) and the method 400 ends (410). Adding a stationary vibration baseline to the road condition database 152 may be useful for later normalizing vibration data received from that device/device type.

If the data is from a moving car on the road (Yes at 406), a determination is made as to whether normalization rules already exist for this device type (412). This determination may be made by accessing the road condition database 152. If the normalization rules do not already exist for the remote device type (No at 412), the vibration data is evaluated to determine a normal steady state using the remote device's status and GPS (414). For example, the data may be evaluated to identify any instances that the car is stopped or moving slowly and is not being held by a user in order to determine the normal steady state for the device's vibration data. From the evaluation of the device's normal steady state vibration data, normalization rules may be generated for the new remote device type (416) and the normalization rules for the device type are applied to the remote device's vibration data (418).

If the normalization rules exist for the remote device data type (Yes at 412), the normalization rules are applied to the remote device's vibration data (418). The normalized data is added to the road condition database 152 (420) and the method 400 ends (422).

Figure 5B:
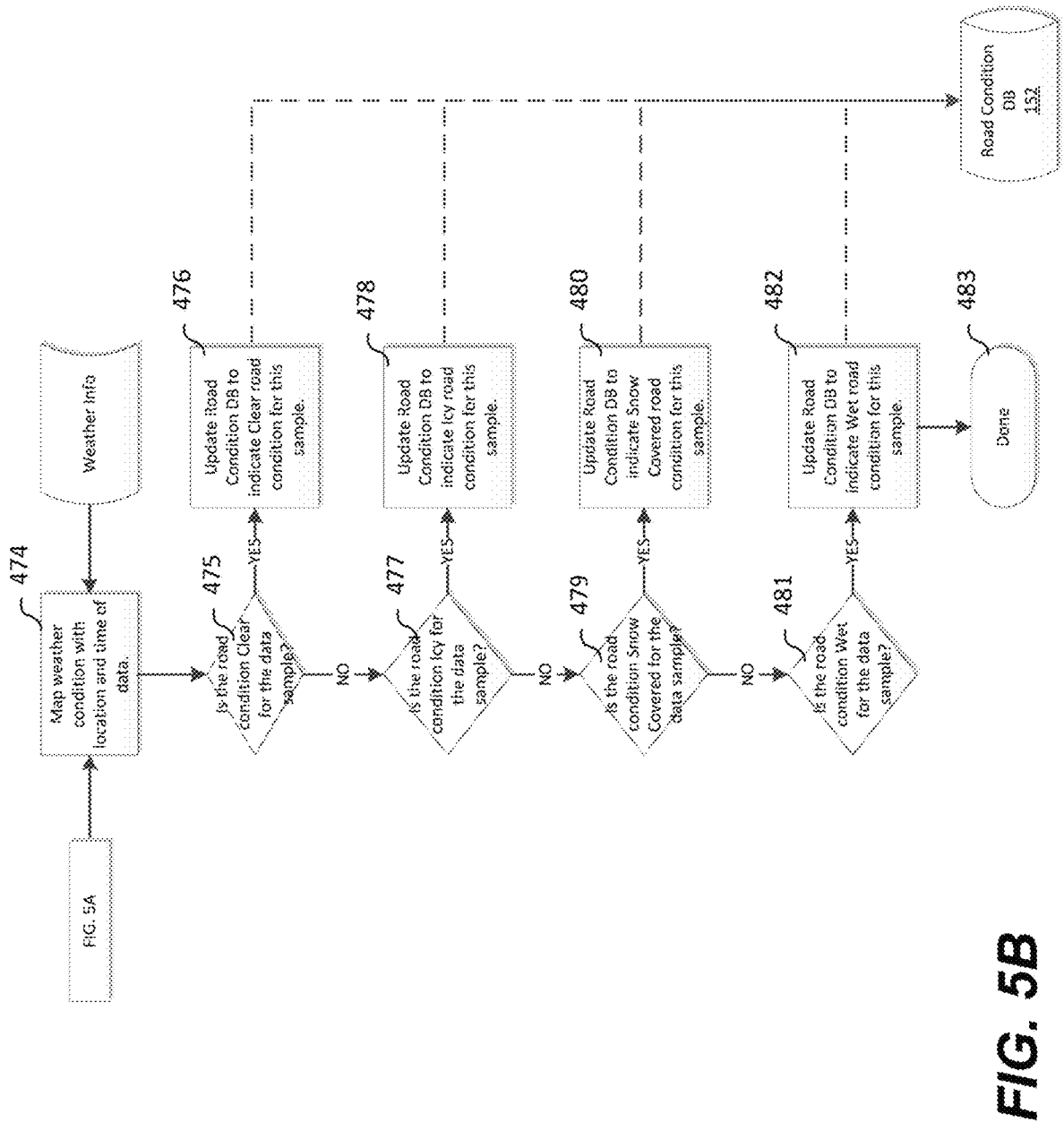

FIGS. 5A and 5B depict a method 450 for combining raw data from a remote device with other data sources. The method 450 may be used during the method 400 for normalizing remote device data. The method 450 commences (451) by reading the new data samples received from the remote device (452) included in the raw road condition data. The latitude and longitude are read from the GPS information of the remote device (453). The latitude and longitude are mapped to a road map (454) which may for example be supplied from the road information/road map database 170. As previously described, the road information/road map database 170 may be provided, for example, from servers/platforms, such as server 162. A determination may be made from the mapped location if the data sample in the raw road condition data is near or on a road (455). If it is determined from the mapped location that the data sample is not near or on a road (No at 455), a determination may be made as to whether the data sample corresponds to a walkway (456). If the data sample does not correspond to the mapped location as a walkway (No at 456), the road condition database 152 is updated with a "Not Applicable" road type for the data sample (457). If the data sample is not on or near a road (No at 455) but is on a walkway (Yes at 456), the road condition database 152 is updated with a "Walkway" road type for the data sample (458). That is, even data received from remote devices that does not necessarily correspond to road condition information may be received and stored in the road condition database 152, which may be useful in model generation.

If it is determined from the mapped location that the data sample is near or on a road (Yes at 455), a determination is made as to whether the data sample corresponds to a gravel road (459). If the road corresponding to the received raw road condition is a gravel road (Yes at 459), the road condition database 152 is updated with a "Gravel" road type for the data sample (460). If the data sample is on or near a road (Yes at 456), and the road is not gravel (No at 459), a determination may be made as to whether the data sample corresponds to a location on a local road (461). If the data sample does not correspond to a location of a local road (No at 461), the road condition database 152 may be updated with an "Unknown" road type for the data sample (462). If the data sample is on a local road (Yes at 461), the road condition database 152 is updated with a "Local" road type for the data sample (463).

The latitude and longitude values of the "Local" road may be matched to a known road condition (464). The known road condition may be determined from acquired/stored road information, such as the time since the last re-paving of the road. The known road information may be determined from city records, contained for example within the road information/road map database 170. A determination may be made as to whether there is any road information for the segment of road at the latitude and longitude (465). If there is no information for the segment of the matched known road (No at 465), the road condition database 152 is updated to an "Unknown" road quality for the data sample (466). If there is information for the segment of the matched known road (Yes at 465), a determination may be made as to whether the road has been re-paved within, for example, the last 3 months (467). If the road has been re-paved within the time period (Yes at 467), the road condition database 152 may be updated with an "Excellent" road quality for the data sample (468). If information shows that the road had not been re-paved in the specified time period (No at 467), a determination may be made as to whether the road has been re-paved within a longer specified time period, for example, the last 6 months (469). If the road has been re-paved within the longer time period (Yes at 469), the road condition database 152 may be updated with a "Very Good" road quality for the data sample (470). If information shows that the road had not been re-paved in the previous 6 months (No at 469), a determination may be made as to whether the road has been re-paved within a still longer specified time period, for example, the last year (471). If the road has been re-paved within the previous year (Yes at 471), the road condition database 152 may be updated with a "Good" road quality for the data sample (472). If information shows that the road had not been re-paved in the previous year (No at 471), the road condition database 152 may be updated with a "Poor" road quality for the data sample (473).

If the data sample has been updated with an "Unknown" road type (462) or with a "Poor" road quality (473), the method 450 may proceed to FIG. 5B. The location and time of the received raw road condition data may be mapped to a weather condition (474). The weather condition may be determined, for example, from a weather service provided by servers/platforms such as server 162 depicted in FIG. 1. The weather condition may alternatively or additionally be provided from the remote device, if available.

A determination may be made as to whether the weather data suggests that the road condition is clear for the data sample received in the raw road condition data (475). If the weather information indicates that the road condition is clear for the data sample (Yes at 475), the road condition database 152 may be updated with a "Clear" road condition for the data sample (476). If the weather information indicates that the road condition is not clear for the data sample (No at 475), a determination may be made as to whether the weather data suggests that the road condition is icy for the data sample received in the raw road condition data (477). If the weather information indicates that the road condition is icy for the data sample (Yes at 477), the road condition database 152 may be updated with an "Icy" road condition for the data sample (478). If the weather information indicates that the road condition is not icy for the data sample (No at 477), a determination may be made as to whether the weather data suggests that the road condition is snow covered for the data sample received in the raw road condition data (479). If the weather information indicates that the road condition is snow covered for the data sample (Yes at 479), the road condition database 152 may be updated with a "Snow Covered" road condition for the data sample (480).). If the weather information indicates that the road condition is not snow covered for the data sample (No at 479), a determination may be made as to whether the weather data suggests that the road condition is wet for the data sample received in the raw road condition data (481). If the weather information indicates that the road condition is wet for the data sample (Yes at 481), the road condition database 152 may be updated with a "Wet" road condition for the data sample (482). Once all possible weather conditions have been exhausted, the method ends (483). A person skilled in the art will readily appreciate that other types of weather condition determinations may be made without departing from the scope of this disclosure, and the above description for combining raw road condition data with data from other data sources is exemplary in nature only.

FIG. 6 depicts a method 600 of generating a road condition model. The road condition model may be generated based on the normalized road condition data as well as external data. The generated road condition models may be used to predict road conditions based on other normalized road data. The method 600 may commence (602) by determining if normalized vibration data exceeds a threshold (604). This determination may be made based on input from the road condition database 152, as well as from data retrieved from external sources such the weather condition service and road map information. The vibration threshold may be a single threshold value for all devices, because the vibration data has been normalized for all device types. The vibration threshold may also be dependent on weather conditions (for example, if snow has just fallen one might expect that the vibration threshold should decrease because potholes may be filled and compacted with snow) and road maps (for example, there may be known road work taking place for a road segment, which may affect the vibration threshold).

The duration of the vibration may also be determined using GPS and speed information (606). The duration of the vibration may be useful, for example, to distinguish between a road issue such as a pothole compared to a road condition such as a raised roadway, which may or may not be known. Any vibration data that indicates the device was being held by the user may be excluded (608) to prevent misleading data. In the case of a mobile device, data indicating that the device is being held by the user may be determined from the device status information, such as whether or not the user is making a call with their device.

Consideration may be given as to whether the road condition data is impacted by weather (610). Any adjustments may be made based on this consideration of weather data, and any known road condition information, such as feedback data from road crews, reporting applications of individuals, may also be applied to adjust a strength of the road condition data to be used in the model (612). As will be further described herein, a weighting may be used against the road condition data (614), and a learning algorithm may be applied (616). From the normalized road condition data as appropriately adjusted and weighted, a road condition model may be generated for a road segment corresponding to the location from which the road condition data was received. The model may be used to monitor and assess road conditions, such as predicting a potential pothole starting to occur (618), identifying a pothole location (620), and/or providing a road condition rating (622). The identification of a pothole or a potential pothole developing on the road segment may be identified as a road issue that city personnel need to address. The method 600 ends (624).

Figures 7A, 7B:
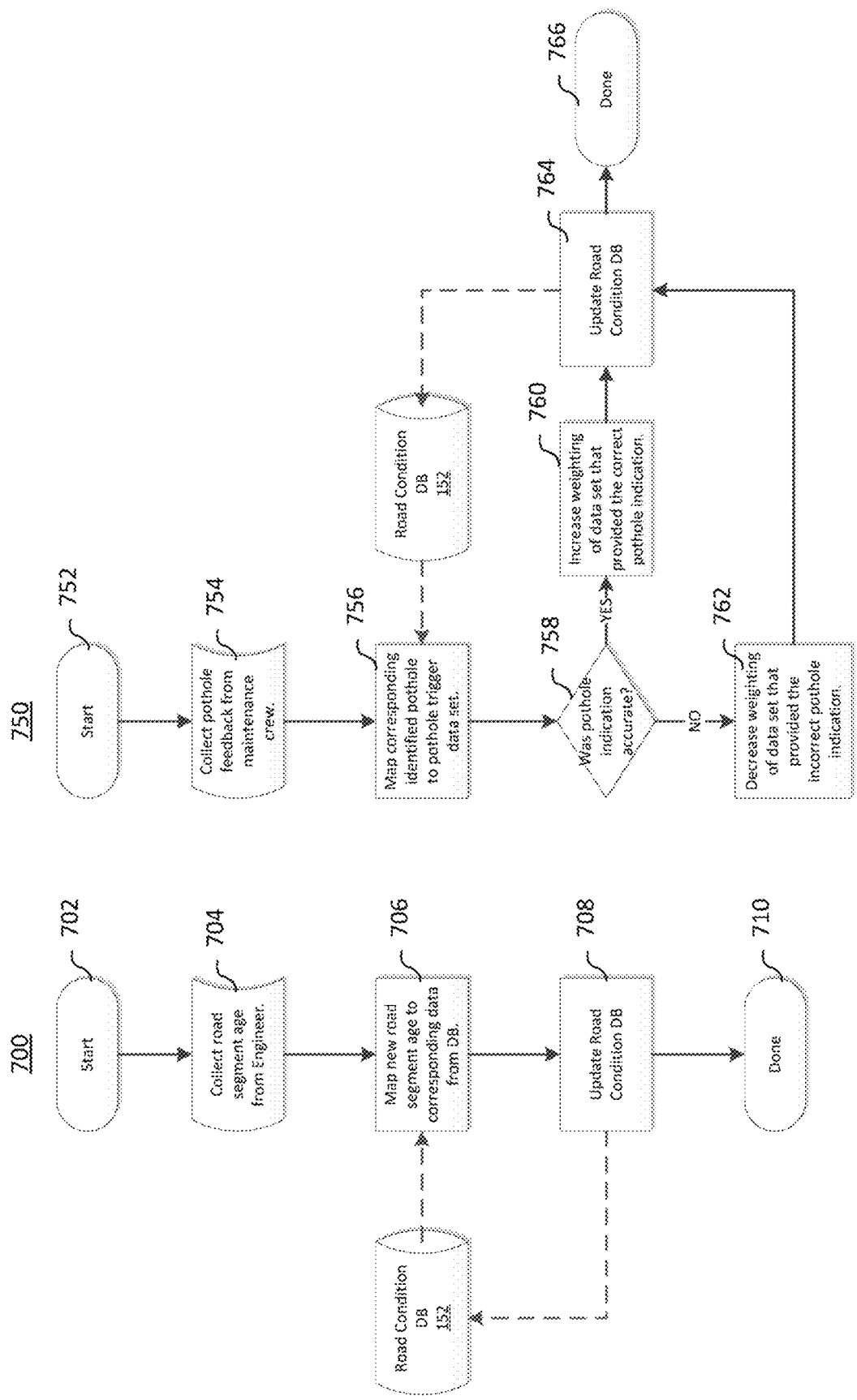
FIGS. 7A and 7B depict methods for optimizing a road condition model.

FIGS. 7A and 7B depict methods for optimizing a road condition model. The method 700 shown in FIG. 7A may be used to update road condition information in the road condition database 152 to improve accuracy of the generated road condition model. The method 750 shown in FIG. 7B may be used to receive feedback about road issues and road conditions identified by the road condition model, allowing for the model parameters to be updated accordingly based on the feedback.

The method 700 commences (702) by collecting the age of a road segment from an engineer (704). The new road segment age may be mapped to the corresponding data stored in the road condition database 152 (706). The road condition database 152 may be updated with the new mapped data (708), and the method 700 ends (710).

The method 750 shown in FIG. 7B commences (752) by collecting pothole feedback from any road maintenance crews or other sources (754). Any potholes identified by the maintenance crews are mapped to road condition data stored in the road condition database 152 that may have identified a pothole (756). A determination is made as to whether the indication of an identified pothole or other road issue was accurate (758). If the pothole indication from the collected and normalized road condition data is accurate when compared to the identified potholes by the maintenance crew (Yes at 758), the weighting of the collected data set may be increased (760). If the collected data provided an incorrect pothole indication (No at 758), the weighting of the collected data set may be decreased (762). The newly weighted data set may be updated in the road condition database 152 (764), and the method 750 ends (766).

Figure 8:
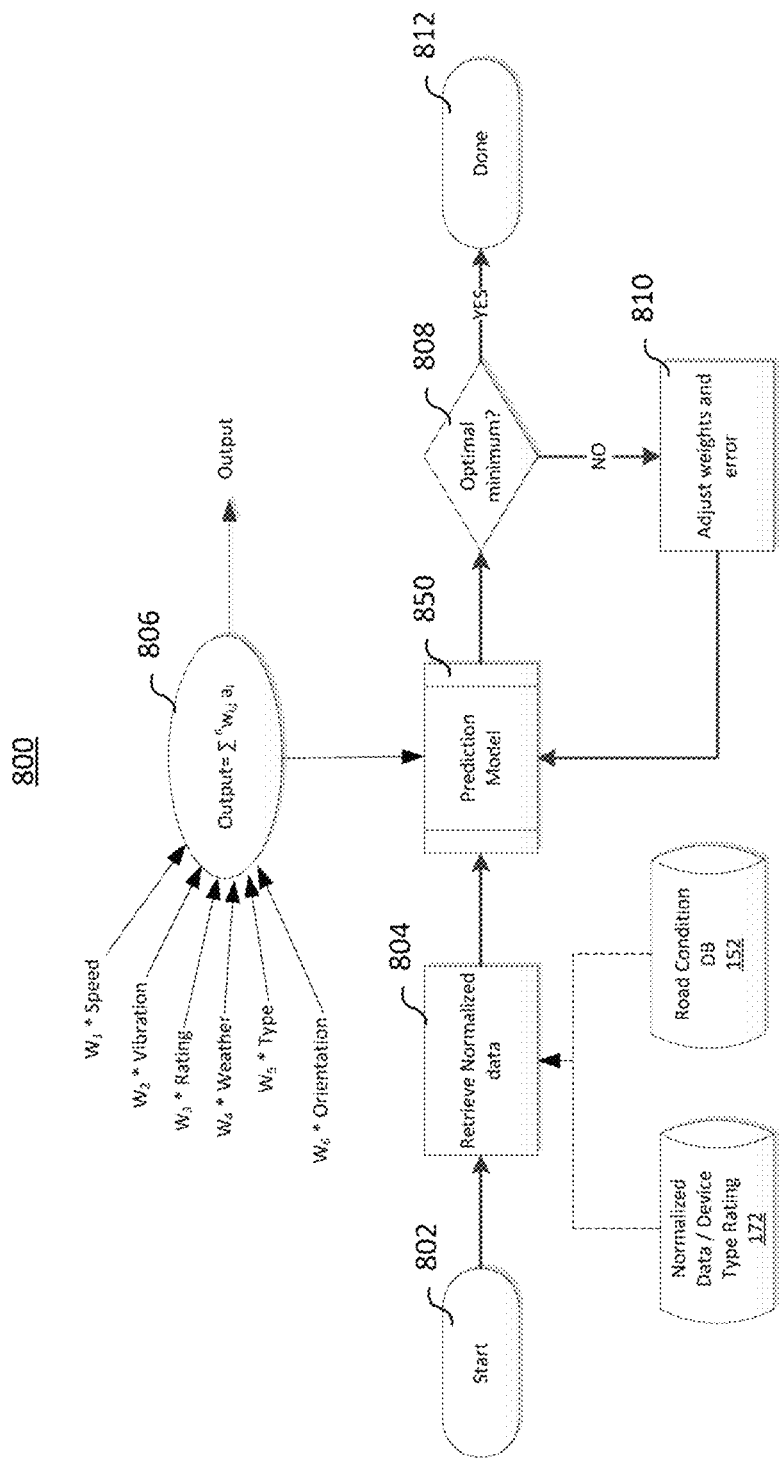
FIG. 8 depicts a method for road condition model training.

FIG. 8 depicts a method 800 for road condition model training. As previously described, the method 800 may be executed to provide an initial training and accuracy of the model, and/or may be executed to subsequently improve the accuracy of the road condition model.

The method 800 commences (802) by retrieving the normalized data (804). The normalized data may be retrieved from the road condition database 152, and the normalized data/device type rating database 172. A prediction model 850, as further depicted in FIG. 9, uses the retrieved normalized data and an output as the sum of weighted road condition data (806). The weighted road condition data may include speed data, vibration data, road ratings, weather data, device type, device orientation etc. The respective weightings for each of these criteria may initially be guessed and subsequently adjusted, such as by using the method 750 and/or adjusting weights as part of the road condition model training described herein. The output as the sum of weighted road condition data may correspond to the same data at step 614 of method 600.

A determination is made based on the output from the prediction model if an optimal minimum has been reached (808). If the prediction model does not output an optimal minimum (No at 810), for example the output of the model does not match an observed or known road condition within a threshold amount, the weights and error of the prediction model 850 are adjusted (810) and the prediction model 850 is executed with the new weights and error values. If the prediction model 850 outputs an optimal minimum (Yes at 808), the method 800 for training the road condition model is completed (812). The road condition data weightings may also be stored in the road condition database 152 (not shown).

Figure 9:
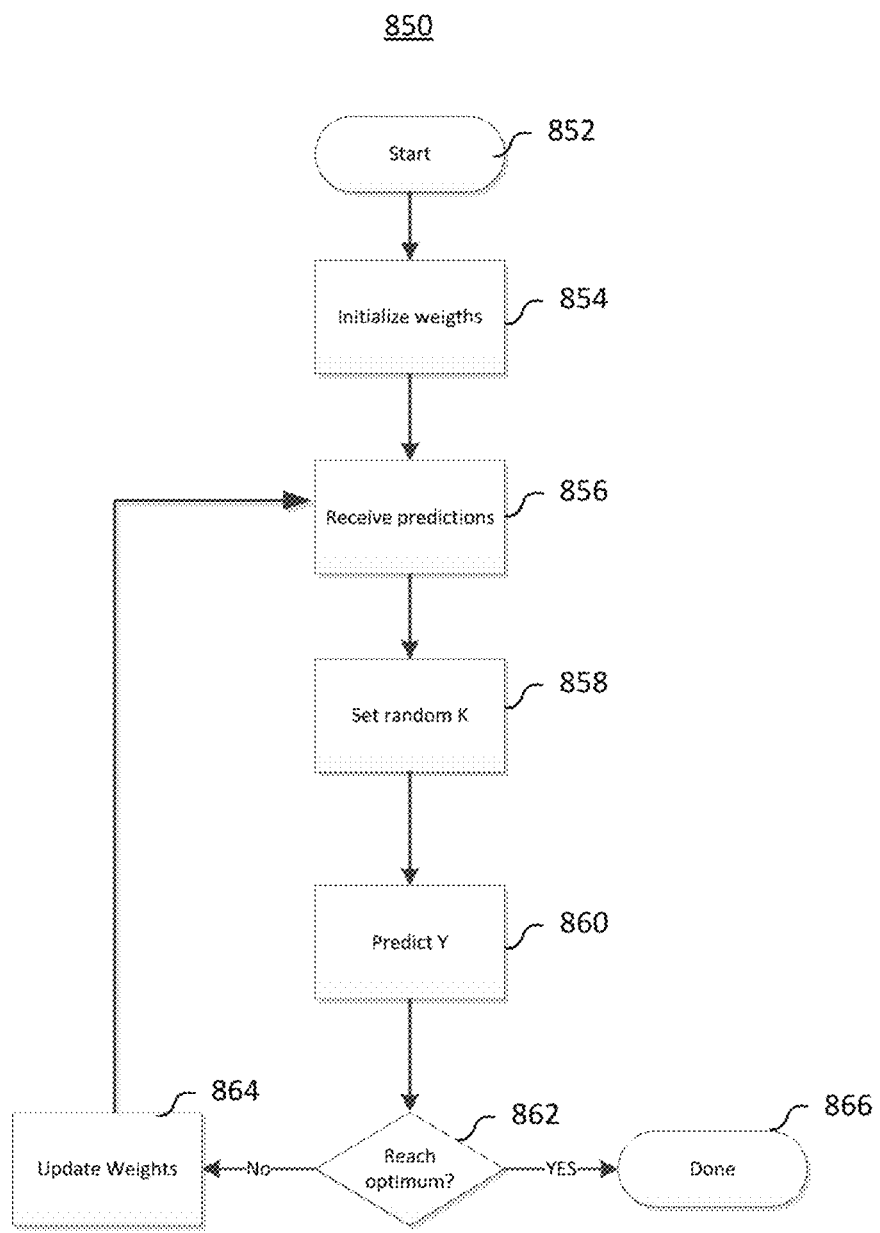
FIG. 9 depicts a method for executing a prediction model for road condition model training.

FIG. 9 depicts a method 850 for executing a prediction model for road condition model training. The method 850 commences (852) by initializing the weights to be applied to the road condition data (854). The model receives predictions (856). A random value for training parameter value K is set from the received predictions (858). A training parameter value Y is predicted (860) based on the training parameter value K. A determination is made based on the predicted training parameter value Y if the model accuracy has reached an optimum (862). If an optimum is not predicted (No at 862), the road condition data weightings are updated (864), and the updated weights are used for a next prediction iteration (856). If the prediction model outputs an optimal minimum (Yes at 862), the executed prediction model 850 is completed (866).

Figure 10:
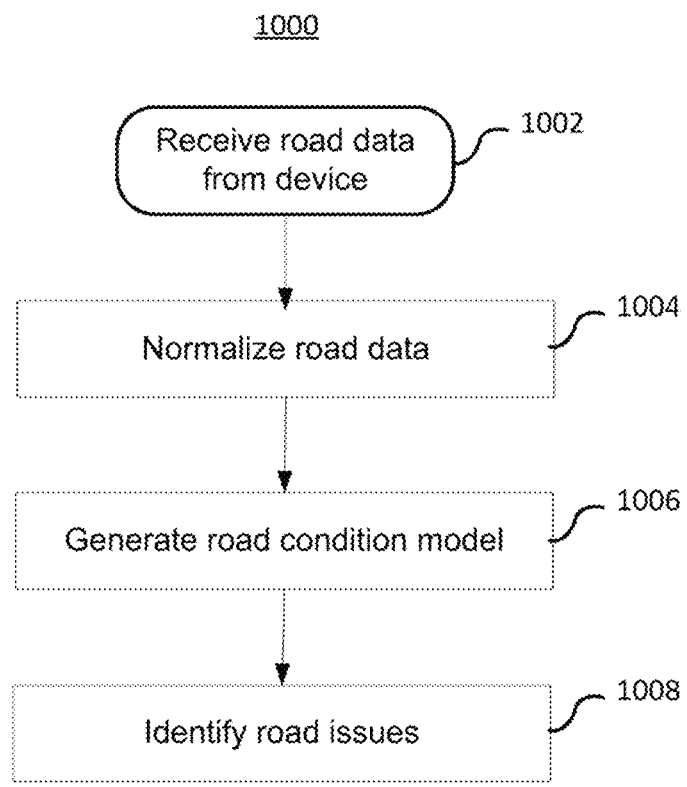
FIG. 10 depicts a method for monitoring and assessing road conditions.

FIG. 10 depicts a method 1000 for monitoring and assessing road conditions. The method 1000 may be stored as computer-executable instructions, for example on a non-transitory computer-readable memory. The method 1000 may be executed for example by a processor of the road condition server 150, where the method 1000 is stored in a memory operably coupled with the processor.

The method 1000 receives raw road condition data from a remote device (1002). As previously described, the raw road condition data may be received from a mobile device of a user in a vehicle, from a sensor of a vehicle telematics system, etc. The raw road condition may be received over a telecommunications network. The raw road condition data may comprise vibration data, speed data, device status, location data, and/or weather data. The raw road condition data may be received in accordance with the method 300 depicted in FIG. 3, for example.

The raw road condition data from the remote device may be normalized (1004). The normalization may be based on the type of the remote device from which the road condition data is received from. Normalization rules may also be applied to the raw road condition data. The normalization rules may be derived from the received raw road condition data and any other road condition data that has been previously received from that particular remote device and/or devices of the same type of remote device. The normalization may be performed in accordance with the method 400 depicted in FIG. 4, for example.

A road condition model may be generated for a road segment corresponding to a location of the remote device from which the raw road condition data was received from (1006). The road condition model may be generated at least in part on the normalized road condition data. The road condition model may be generated based further on data received from external sources, such as weather data and/or road data. The road condition model may be generated based further on data received from internal sources, such as feedback and information received from city personnel. The model may be generated in accordance with the method 600 depicted in FIG. 6, for example. The model may be optimized in accordance with the methods 700 and 750 depicted in FIGS. 7A and 7B, for example. The model may also be trained in accordance with the method 800 depicted in FIG. 8, for example.

Road issues for the road segment may be identified from the generated road condition model (1008). The road issues may for example identify and/or predict a pothole for the road segment which may, as described above, promote future road repair and may provide an indication for city crews to be dispatched for pothole repair. The road issues may for example be determined based on vibration data that has exceeded a threshold value.

It would be appreciated by one of ordinary skill in the art that the system and components shown in FIGS. 1-10 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as defined in the claims.

What is claimed is:

1. A method comprising:
   receiving at a server raw road condition data and associated location information from a remote device indicative of a road condition;
   normalizing at the server the raw road condition data based on a type of the remote device;
   applying at the server the normalized road condition data to a road condition model generated from previously received road condition data for use in predicting road conditions, wherein the road condition model is trained by determining weights to be applied to the normalized road condition data, wherein determining the weights comprises:
   applying the weights to the normalized road condition data;
   comparing an output to observed feedback information; and
   adjusting the weights if the output does not match to the feedback information within a threshold amount; and
   identifying at the server from the road condition model whether there is a road issue for a road segment associated with the location information.

2. The method of claim 1, wherein the raw road condition data is any one or more of: vibration data, speed data, device status, location data, and weather data.

3. The method of claim 1, wherein the remote device is any one of: a mobile device of a user in a vehicle, and a telematics device of the vehicle.

4. The method of claim 1, wherein the raw road condition data is normalized by applying normalization rules derived from one or both of the received raw road condition data and previously received raw road condition data for the type of the remote device.

5. The method of claim 1, wherein the road condition model is generated further based on external data received from a third party.

6. The method of claim 1, wherein the road condition model is generated further based on data received from internal sources.

7. The method of claim 1, further comprising:
rating the road segment based on the road condition model.

8. The method of claim 2, wherein the raw road condition data comprises the device status, and wherein normalized road condition data indicating that the remote device is being held by a user is excluded when generating the road condition model.

9. The method of claim 2, wherein the raw road condition data comprises vibration data, and wherein the road issue is determined if vibration data exceeds a vibration threshold value.

10. The method of claim 3, further comprising:
determining if the vehicle is traveling on the road segment,
wherein the road condition model for the road segment is generated at least in part from the normalized data when it is determined that the vehicle is traveling on the road segment.

11. The method of claim 10, further comprising:
storing the normalized data as a baseline for the type of the remote device when it is determined that the vehicle is not traveling on the road segment.

12. The method of claim 9, wherein the road issue is determined further based on a duration of the vibration data.

13. The method of claim 12, wherein the road issue is a pothole.

14. A system comprising:
a processor; and
a memory operably coupled with the processor, the memory comprising computer-readable instructions stored thereon which, when executed by the processor, configure the processor to:
receive raw road condition data and associated location information from a remote device indicative of a road condition;
normalize the raw road condition data based on a type of the remote device;
apply the normalized road condition data to a road condition model generated from previously received road condition data for use in predicting road conditions, wherein the road condition model is trained by determining weights to be applied to the normalized road condition data, wherein determining the weights comprises:
applying the weights to the normalized road condition data;
comparing an output to observed feedback information; and
adjusting the weights if the output does not match to the feedback information within a threshold amount; and
identify from the road condition model whether there is a road issue for a road segment associated with the location information.

15. The system of claim 14, wherein the remote device is any one of: a mobile device of a user in a vehicle, and a telematics device of the vehicle.

16. The system of claim 15, wherein the instructions when executed by the processor further configure the system to:
determine if the vehicle is traveling on the road segment,
wherein the road condition model for the road segment is generated at least in part from the normalized data when it is determined that the vehicle is traveling on the road segment.

17. The system of claim 16, wherein the instructions when executed by the processor further configure the system to:
store the normalized data as a baseline for the type of the remote device when it is determined that the vehicle is not traveling on the road segment.

18. A non-transitory computer-readable medium having computer-executable instructions stored thereon, which when executed by a computer, configure the computer to perform a method comprising:
receive raw road condition data and associated location information from a remote device indicative of a road condition;
normalize the raw road condition data based on a type of the remote device;
apply the normalized road condition data to a road condition model generated from previously received road condition data for use in predicting road conditions, wherein the road condition model is trained by determining weights to be applied to the normalized road condition data, wherein determining the weights comprises:
applying the weights to the normalized road condition data;
comparing an output to observed feedback information; and
adjusting the weights if the output does not match to the feedback information within a threshold amount; and
identify from the road condition model whether there is a road issue for a road segment associated with the location information.

* * * * *